(12) United States Patent
Etschmaier et al.

(10) Patent No.: US 11,448,730 B2
(45) Date of Patent: Sep. 20, 2022

(54) OPTICAL SENSOR ARRANGEMENT AND METHOD FOR MANUFACTURING AN OPTICAL SENSOR ARRANGEMENT

(71) Applicant: ams AG, Premstaetten (AT)

(72) Inventors: Harald Etschmaier, Graz (AT); Rainer Minixhofer, Premstaetten (AT); Georg Roehrer, Lebring (AT)

(73) Assignee: AMS AG, Premstaetten (AT)

( * ) Notice: Subject to any disclaimer, the term of this patent is extended or adjusted under 35 U.S.C. 154(b) by 957 days.

(21) Appl. No.: 16/306,949

(22) PCT Filed: Jun. 2, 2017

(86) PCT No.: PCT/EP2017/063555
§ 371 (c)(1),
(2) Date: Dec. 4, 2018

(87) PCT Pub. No.: WO2017/211742
PCT Pub. Date: Dec. 14, 2017

(65) Prior Publication Data
US 2019/0146069 A1 May 16, 2019

(30) Foreign Application Priority Data
Jun. 7, 2016 (EP) ..................... 16173353

(51) Int. Cl.
*G01S 7/481* (2006.01)
*G01S 7/497* (2006.01)
(Continued)

(52) U.S. Cl.
CPC ............ *G01S 7/4813* (2013.01); *G01S 7/497* (2013.01); *G01S 17/10* (2013.01); *G02B 5/08* (2013.01); *G02B 5/20* (2013.01)

(58) Field of Classification Search
CPC ........ G01S 17/10; G01S 7/4813; G01S 7/497; G01S 17/04; G01S 17/08; G01S 7/4816;
(Continued)

(56) References Cited

U.S. PATENT DOCUMENTS

| 2016/0003944 | A1* | 1/2016 | Schmidtke | ............. G01S 7/481 356/4.07 |
| 2017/0038459 | A1* | 2/2017 | Kubacki | ............... G01J 1/0425 |
| 2019/0259902 | A1* | 8/2019 | Shimizu | ............. H01L 27/1446 |

FOREIGN PATENT DOCUMENTS

| EP | 2728387 | 5/2014 | |
| EP | 2728387 A1 * | 5/2014 | ........... G01S 17/026 |
| WO | 2015/136100 | 9/2015 | |

OTHER PUBLICATIONS

European Patent Office, International Search Report for PCT/EP2017/063555 dated Sep. 19, 2017.

* cited by examiner

*Primary Examiner* — Yuqing Xiao
*Assistant Examiner* — Amir J Askarian
(74) *Attorney, Agent, or Firm* — MH2 Technology Law Group LLP

(57) ABSTRACT

An optical sensor arrangement for time-of-flight comprises a first and a second cavity separated by an optical barrier and covered by a cover arrangement. An optical emitter is arranged in the first cavity, a measurement and a reference photodetector are arranged in the second cavity. The cover arrangement comprises a plate and layers of material arranged on an inner main surface thereof. The layers comprise an opaque coating with a first and second aperture above the first cavity, and with a third and fourth aperture above the second cavity. The measurement photodetector is configured to detect light entering the second cavity through the fourth aperture. The second and the third aperture (Continued)

establish a reference path for light from the emitter to the reference photodetector.

14 Claims, 3 Drawing Sheets

(51) Int. Cl.
  *G01S 17/10* (2020.01)
  *G02B 5/08* (2006.01)
  *G02B 5/20* (2006.01)

(58) Field of Classification Search
  CPC ...... G01S 7/4863; G01S 17/88; G01S 17/931;
    G01S 7/4814; G01S 7/484; G01S 7/4868;
    G01S 7/4876; G02B 5/08; G02B 5/20;
    F16P 3/14; G01B 11/02; G01C 3/08;
    G01J 1/06; G01J 1/1626; G01J 1/4204;
    G01R 3/00; G03B 13/20; G03B 13/36;
    G05D 1/0088; H01L 2224/16225; H01L
    27/1446; H01L 27/146; H01L 27/14618;
    H01L 31/02027; H01L 31/107; H01L
    31/12; Y10T 156/10; Y10T 29/49002
  See application file for complete search history.

OPTICAL SENSOR ARRANGEMENT AND METHOD FOR MANUFACTURING AN OPTICAL SENSOR ARRANGEMENT

BACKGROUND OF THE INVENTION

The disclosure relates to an optical sensor arrangement, in particular for time-of-flight measurement, and to a method for manufacturing such an optical sensor arrangement.

Optical sensors for time-of-flight, TOF, measurement may be used for example in a distance measurement system. Applications of such distance measurement systems may include for example camera autofocus assistance systems, parking assistance systems for vehicles and control or monitoring systems for self-driving vehicles.

For TOF based measurement of a distance between a device comprising the sensor or range finder and an object, a time duration between two events is measured. The two events may correspond to a time when a signal leaves the sensor and when it is received again after reflection from the object. The time duration between these two events is for example directly proportional to the desired distance. Consequently, a precision of the distance measurement is directly proportional to a precision of the time measurement.

SUMMARY OF THE INVENTION

The present disclosure provides an improved concept for an optical sensor arrangement for time-of-flight measurement with an increased precision.

The improved concept is based on the idea of providing an optical emitter in a first cavity of an optical sensor housing and a measurement photodetector as well as a reference photodetector in a second cavity of the housing. The cavities are optically separated by an optical barrier. Moreover, the cavities are covered by a translucent cover plate with an opaque coating having two outer apertures for light emission by the emitter and respective detection of light reflected from an object by the measurement photodetector. In this way, a stop time for the TOF measurement may be determined. Two inner apertures of the opaque coating enable a reference path for light emitted by the emitter to reach the reference photodetector via the cover plate. In this way, a start time for the TOF measurement may be determined.

According to the improved concept, an optical sensor arrangement for TOF measurement is provided. The sensor arrangement comprises a housing with a first and a second cavity separated by an optical barrier, and with a cover arrangement covering the first and the second cavity. The housing may for example comprise the cover arrangement and a housing body including the optical barrier. The sensor arrangement further comprises an optical emitter, a measurement photodetector and a reference photodetector. The emitter is arranged in the first cavity, while the measurement photodetector and the reference photodetector are both arranged in the second cavity.

The cover arrangement comprises a translucent or transparent plate or cover plate and one or more layers of material arranged on an inner main surface of the plate. The one or more layers comprise an opaque, in particular optically opaque, coating with a first and a second aperture located above the first cavity, and with a third and a fourth aperture located above the second cavity.

The emitter is configured and arranged, in particular, the emitter and the first aperture are mutually arranged, to emit light through the first aperture, in particular to outside of the sensor arrangement. The measurement photodetector is configured and arranged, in particular, the measurement photodetector and the fourth aperture are mutually arranged, to detect light entering the second cavity through the fourth aperture, in particular entering from outside of the sensor arrangement. The second and the third aperture establish a reference path for light from the emitter to the reference photodetector.

Herein, "light" refers to visible light, infrared radiation and ultraviolet radiation, if not stated otherwise.

The expression "opaque" refers to opacity at least for light with a wavelength within an emission wavelength range of the optical emitter. "Opaque" may further include opacity for infrared radiation. "Opaque" may further include opacity for visible light and/or ultraviolet radiation.

The translucent or transparent plate is translucent or transparent, respectively, at least for light with a wavelength within the emission wavelength range, if not stated otherwise.

According to some implementations of the sensor arrangement, the emission wavelength range corresponds to infrared radiation.

According to some implementations of the sensor arrangement, the second and the third aperture are located between the first and the fourth aperture.

This means for example that a distance between the first aperture and the fourth aperture is greater than a distance between the second aperture and the fourth aperture and greater than a distance between the third aperture and the fourth aperture.

Therein, said distances may correspond in particular to distances in direction of a connection line between the first and the fourth aperture, for example between centers of the first and the fourth aperture. In particular, the distance between the first aperture and the second aperture may correspond to a distance between the first aperture and a projection of the second aperture on the connection line between the first and the fourth aperture. The same holds analogously for the distance between the first aperture and the third aperture.

According to some implementations of the sensor arrangement, the second aperture is located between the first aperture and the optical barrier. The third aperture is located between the fourth aperture and the optical barrier. The optical barrier is located between the second and the third aperture.

According to some implementations of the sensor arrangement, the optical barrier has two parallel main surfaces facing the first and the second cavity, respectively. The main surfaces of the optical barrier are for example perpendicular to the main surfaces of the cover plate.

According to some implementations of the sensor arrangement, the first and the second aperture both lie within an emission volume or emission cone of the emitter.

Therein, the emission volume or cone includes all points in space that may be theoretically illuminated by the emitter, in particular for a fixed emitter position and orientation within the sensor arrangement.

According to some implementations of the sensor arrangement, the first, second, third and fourth apertures are defined by respective openings in the opaque coating.

According to some implementations of the sensor arrangement, the first and the second aperture are separated from each other, in particular by the opaque coating. The first and the second aperture are then for example defined by separate openings in the opaque coating.

In alternative implementations, the first and the second aperture are connected to each other. In particular, the first and the second aperture are formed by a common opening in the opaque coating. In such implementations, the first and the second apertures may be denoted as aperture portions of a common aperture area.

According to some implementations of the sensor arrangement, the second and the third aperture are separated from each other by the opaque coating. The second and the third aperture are then for example defined by separate openings in the opaque coating.

In alternative implementations, the second and the third aperture are connected to each other. In particular, the second and the third aperture are formed by a common opening in the opaque coating. In such implementations, the second and the third apertures may be denoted as aperture portions of a common aperture area.

In general, in particular also in implementations where second and the third aperture are connected to each other, the optical barrier is arranged between the second and the third aperture and therefore effectively separates the second and the third aperture from each other. Consequently, light cannot enter the cover plate directly from the first cavity through the third aperture.

According to some implementations of the sensor arrangement, the opaque coating comprises an aperture area containing the first aperture. The aperture area is defined by a single opening in the opaque coating.

The second aperture may be contained by the aperture area. Otherwise, the second aperture may be separated from the aperture area. The third aperture may be contained by the aperture area, in particular if the second aperture is contained by the aperture area. Otherwise, the third aperture may be separated from the aperture area.

In operation, the optical emitter may for example emit light. A fraction of the emitted light may enter the cover plate via the second aperture and enter the second cavity via the third aperture and consequently may hit the reference photodetector as a reference beam of light. A start time for the TOF measurement may be determined depending on the detection of the reference beam by the reference photodetector.

A further fraction of the emitted light, in particular a main fraction, may leave the sensor arrangement through the first aperture, be at least partially reflected by an external object and enter the second cavity via the fourth aperture to hit the measurement photodetector as a measurement beam of light. A stop time for the TOF measurement may be determined depending on the detection of the measurement beam by the measurement photodetector.

Due to the arrangement of the emitter in the first cavity and both photodetectors in the second cavity, unwanted optical crosstalk from the emitter to the photodetectors, in particular to the measurement photodetector, and light leakage between the cavities may be avoided. This may lead to an improved precision of the determined start and/or stop time and consequently of the TOF.

The apertures are defined by openings in the opaque coating. Consequently, sizes and locations of the apertures may be controlled precisely, for example by means of a lithographic structuring process on the cover plate. Furthermore, smaller feature sizes may be achieved in this way. In particular, these advantages may render the improved concept superior compared to approaches using a molding process for defining apertures. Consequently, the reference and measurement beam intensity, position and/or direction may be controlled in a particularly accurate way according to the improved concept. This may further reduce undesired optical crosstalk between the emitter and the measurement photodetector and thus improve the precision of the measurement.

According to some implementations of the sensor arrangement, the measurement photodetector and the reference photodetector are integrated on a single detector die, in particular semiconductor die.

For example, the measurement photodetector and the reference photodetector are integrated on a first semiconductor die and the emitter is implemented on a second semiconductor die.

In some implementations, the optical barrier is located between the first and the second semiconductor die.

Consequently, the optical barrier separating the first and the second cavity does not cross one of the first or the second semiconductor die and therefore may not run over uneven surfaces. Thus, a light leakage between the first and the second cavity may be further reduced leading to an improved accuracy for determining the start and stop times.

According to some implementations, the inner main surface corresponds to a main surface of the plate directed towards the first and the second cavity.

According to some implementations, the opaque coating is the innermost of the one or more layers of material. In particular, the opaque coating is the one of the one or more layers directly facing the first and second cavity.

According to some implementations of sensor arrangement, the first and the second aperture are located at a part of the cover arrangement facing the first cavity. The third and the fourth aperture are located at a part of the cover arrangement facing the second cavity. According to some implementations of the sensor arrangement, the first aperture is located above the optical emitter, in particular directly above the optical emitter. The fourth aperture is located above the measurement photodetector, in particular directly above the measurement photodetector.

Therein, "located above" means that a projection of the optical emitter or the measurement photodetector, respectively, in particular an active surface of the optical emitter or the measurement photodetector, respectively, on the cover arrangement, in particular along a direction perpendicular to the inner main surface of the plate, overlaps at least partially with the first or the fourth aperture, respectively.

Furthermore, "located directly above" means that a projection of a center of the optical emitter or the measurement photodetector, in particular of an active surface of the optical emitter or the measurement photodetector, respectively, on the cover arrangement, in particular along the direction perpendicular to the inner main surface of the plate, coincides with a center of the first or the fourth aperture, respectively.

According to some implementations of the sensor arrangement, a distance between the reference photodetector and the optical barrier is less than a distance between the measurement photodetector and the optical barrier.

Consequently, stray light of the reference beam hitting the measurement photodetector may be reduced or avoided leading to an improved accuracy.

According to some implementations of the sensor arrangement, the opaque coating is configured to block, attenuate and/or absorb at least light with a wavelength lying within the emission wavelength range. In some implementations, the opaque coating is configured to block, attenuate and/or absorb all light having a wavelength the measurement photodetector and/or the reference photodetector is sensitive to.

According to some implementations of the sensor arrangement, a size of the second aperture, a size of the third aperture and/or a mutual arrangement of the emitter, the reference photodetector, the second aperture and the third aperture is adapted such that fractions of light emitted by the emitter enter the plate through the second aperture, are at least partially reflected at an outer main surface of the plate, enter the second cavity through the third aperture and hit the reference photodetector.

The outer main surface corresponds to a main surface of the plate opposite to the inner main surface, in particular facing away from the first and the second cavity. The inner and the outer main surface may for example be parallel or approximately parallel to each other.

According to some implementations of the sensor arrangement, the sizes of the second and third aperture and/or the mutual arrangement of the emitter, the reference photodetector and the second and third aperture and is adapted such that one or more ray paths from the emitter to the reference photodetector including a specular reflection at the outer main surface is permitted, in particular not blocked.

According to some implementations of the sensor arrangement, the fraction of light entering the plate through the second aperture is at least partially reflected at an interface between the plate, in particular the outer main surface, and a medium, for example air, outside of the sensor arrangement.

According to some implementations of the sensor arrangement, the cover arrangement further comprises a mirror layer arranged on the outer main surface of the plate or on a coating, for example an anti-reflective coating, arranged on the outer main surface. The mirror layer covers at least a portion of the outer main surface located between the second and the third aperture.

Herein, the expression "located between" corresponds to located laterally, in particular in a direction parallel to the outer main surface, between. In particular, the mirror layer covers at least a portion of the outer main surface between projections of the second and third aperture on the outer main surface.

In such implementations, the fractions of light entering the plate through the second aperture are reflected at least partially at an interface between the plate and the mirror layer. In this way, an amount of light entering the second cavity through the third aperture via the reference path may be increased and therefore the measurement accuracy, in particular precision of the start time, may be improved.

According to some implementations of the sensor arrangement, the mirror layer is a metal layer, in particular a structured metal layer, for example an aluminum layer.

According to some implementations of the sensor arrangement, the mirror layer further covers portions of the outer main surface located directly above the second and/or the third aperture. Therein, the portions located directly above the second and third aperture correspond to respective projections of the second and third aperture on the outer main surface.

Such implementations may have the additional advantage that ambient light or stray light from outside of the sensor arrangement may be prevented from entering the second cavity and being detected by the reference photodetector, as such light could tamper the measurement. Thus, the measurement accuracy, in particular precision of the start time, may be further improved in such implementations.

The mirror layer may cover further portions of the outer main surface. However, the mirror layer has to at least partially leave open the first and the fourth aperture or their respective projections on the outer main surface, respectively, for correct operation of the sensor arrangement.

According to some implementations of the sensor arrangement, the cover arrangement further comprises an anti—reflective coating arranged on the outer main surface of the plate. The anti-reflective coating covers at least a portion of the outer main surface located directly above the first and/or the fourth aperture. Therein, the portions located directly above the first and fourth aperture correspond to respective projections of the first and fourth aperture on the outer main surface. The anti-reflective coating is for example configured to suppress reflection of light with a wavelength within the emission wavelength spectrum.

By means of the anti-reflective coating, it may be avoided that light that has entered the cover plate for example via the first or the second aperture enters the second cavity via the fourth aperture after being reflected from the outer main surface. Furthermore, light leaving the first cavity through the first aperture and being reflected back into the cover plate from the outer main surface may be reduced. In this way, the measurement accuracy, in particular precision of the start and/or the stop time, a further improved.

In some implementations of the sensor arrangement, the anti-reflective coating is implemented as a dielectric layer and may for example comprise silicon nitride, silicon dioxide or hafnium oxide.

In some implementations, a thickness of the anti-reflective coating or dielectric layer is given by or approximately given by $1/(4n)$. Therein, 1 corresponds to an emission wavelength of the emitter and n corresponds to the dielectric constant of the anti-reflective coating or dielectric layer.

In some implementations comprising the mirror layer and the anti-reflective coating, the mirror layer is arranged directly on the outer main surface of the plate and the anti-reflective coating is arranged directly on the outer main surface in regions left open by the mirror layer. In particular, the mirror layer may be deposited on the cover plate and the anti-reflective coating may be deposited on the cover plate after the deposition of the mirror layer.

In some implementations comprising the mirror layer and the anti-reflective coating, the anti-reflective coating is arranged directly on the outer main surface and the mirror layer is arranged on the anti-reflective coating. In particular, the anti-reflective coating is arranged between the cover plate and the mirror layer at respective regions where the mirror layer is present.

In such implementations, the anti-reflective coating does not act as an anti-reflective coating in the regions, where it is covered by the mirror layer. In particular, the fractions of light entering the plate through the second aperture are reflected at an interface between the anti-reflective coating and the mirror layer and consequently may still enter the second cavity through the third aperture.

In some implementations comprising the anti-reflective coating but not the mirror layer, the anti-reflective coating is structured such that it does not cover the portion of the outer main surface located between the second and the third aperture. In particular, the anti-reflective coating does not cover the portion of the outer main surface, where light propagating along the reference path is reflected from the outer main surface.

In some implementations of the sensor arrangement, the one or more layers of material further comprise an optical filter layer covering at least a portion on the inner main surface corresponding to the fourth aperture. The optical filter layer is configured to pass light with a wavelength lying within the emission wavelength range of the emitter.

According to some implementations of the sensor arrangement, the optical filter layer is configured to block or attenuate light with a wavelength outside of the emission wavelength range.

Due to the filter layer covering the fourth aperture, it may be avoided that undesired ambient or stray light from outside of the sensor arrangement is detected by the measurement photodetector. Consequently, the accuracy of the measurement, in particular the precision of the stop time, may be improved.

In some implementations of the sensor arrangement, the filter layer is arranged between the opaque coating and the cover plate, for example directly on the inner main surface.

In some implementations, the filter layer covers the inner main surface of the cover plate, in particular portions of the inner main surface facing the first and/or the second cavity, completely.

In such implementations, the requirements on the opaque coating may be relaxed. In particular, it may be sufficient that the opaque coating is opaque with respect to light with a wavelength within the emission wavelength range.

According to some implementations of the sensor arrangement, the optical filter layer is implemented as an interference filter, a dielectric filter or a dichroic filter.

According to some implementations of the sensor arrangement, the opaque coating comprises or consists of an ink, in particular black ink.

Using ink for the opaque coating and for example lithographic structuring of the ink layer may allow to realize smaller feature sizes in a more precise way. Consequently, the reference path may be defined with a particularly high accuracy. Thus, the measurement accuracy, in particular the precision of the start time, may be further improved. A commercially available and suitable type of black ink may for example "Litho-Black™".

According to some implementations of the sensor arrangement, the housing, in particular the housing body, comprises a frame body confining the first and the second cavity, in particular laterally. Therein, "laterally" refers to directions parallel to the main surfaces of the cover plate.

According to some implementations of the sensor arrangement, the frame body and the optical barrier are comprised by one continuous piece of material, for example by a single molded piece of material.

In particular, the frame body and the optical barrier are not fabricated separately and connected to each other afterwards, for example by an adhesive. Consequently, undesired leakage of light between the first and the second cavity at interfaces between the optical barrier and the frame body may be avoided.

According to some implementations of the sensor arrangement, the housing, in particular the housing body, comprises a bottom plate on which the measurement photodetector, the reference photodetector and the emitter are arranged. The bottom plate confines the first and the second cavity on a side opposite to the cover arrangement.

According to some implementations of the sensor arrangement, the frame body, the optical barrier and at least parts of the bottom plate, in particular all parts of the bottom plate except for optional electrically conducting structures embedded within the bottom plate, are comprised by one continuous piece of material.

For example, in particular the frame body, the optical barrier and the bottom plate may be fabricated as a pre-molded housing body on a leadframe. In such implementations, light leakage between the first and the second cavity, in particular via interfaces between the bottom plate and the frame body or between the bottom plate and the optical barrier may be avoided.

In alternative implementations, the bottom plate is implemented as a carrier substrate comprising for example a plastic material, an epoxy material a composite material, an FR-4 material or a ceramics. In such implementations, the frame body and/or the optical barrier are attached to the bottom plate, for example by an adhesive.

Using an epoxy material, a plastic material or a ceramics for fabricating the bottom plate, in particular the carrier substrate or the housing body, may have the advantage that light leakage between the first and the second cavity through the material of the bottom plate may be avoided. Such undesired light leakage may for example occur when using an FR-4 material or another material containing fiberglass or similar light conducting components. On the other hand, FR-4 material may have the advantage of reduced costs and/or simple processability.

According to some implementations, the sensor arrangement further comprises a control unit. The measurement photodetector is configured to generate a measurement signal in response to light detected by the measurement photodetector. The reference photodetector is configured to generate a reference signal in response to light detected by the reference photodetector. The control unit is configured to compute a TOF depending on the measurement signal and the reference signal. In particular, the TOF corresponds to a TOF of light emitted by the sensor arrangement, in particular the emitter, reflected at least partially by the external object and subsequently reaching the sensor arrangement again, in particular the measurement photodetector.

In particular, the control unit is configured to compute a start time t1 depending on the reference signal and a stop time t2 depending on the measurement signal. The TOF $t_{TOF}$ is then for example computed according to the formula $t_{TOF} = t2 - t1$.

In some implementations, the control unit is configured to compute the TOF according to the formula $t_{TOF} = t2 - t1 - t_{off}$. Therein, $t_{off}$ represents an offset time taking into account a length of the reference path $D_{ref}$ as $t_{off} = D_{ref}/c$, with c being the speed of light.

According to some implementations of the sensor arrangement, the control unit, the measurement photodetector and the reference photodetector are integrated on a single semiconductor die, in particular the detector die. For example, a single integrated circuit comprises the control unit and the photodetectors.

According to some implementations of the sensor arrangement, the measurement photodetector comprises a single-photon avalanche diode, SPAD, or an array of SPADs.

According to some implementations of the sensor arrangement, the reference photodetector comprises a further single-photon avalanche diode, SPAD, or a further array of SPADs.

According to some implementations of the sensor arrangement, the optical emitter comprises a laser, in particular a vertical-cavity surface-emitting laser, VCSEL, vertical-external-cavity surface-emitting-laser, VECSEL, an edge-emitting laser diode or an LED. The laser or LED may in particular be implemented as an infrared laser or LED.

According to some implementations, the sensor arrangement comprises an emitter lens for focusing light emitted by the emitter and/or a detector lens for focusing light entering the second cavity through the fourth aperture.

The emitter lens is for example arranged above, particular directly above, the emitter on a side of the cover arrangement facing the emitter. In particular, the emitter lens may cover the first aperture. The detector lens is for example arranged above, particular directly above, the measurement photodetector on a side of the cover arrangement facing the measurement photodetector. In particular, the detector lens may cover the fourth aperture.

According to some implementations of the sensor arrangement, the cover plate is implemented as a glass plate or a plastic plate.

According to the improved concept, also a method for manufacturing an optical sensor arrangement for TOF measurement is provided. The method comprises providing a cover arrangement with a translucent or transparent cover plate and with one or more layers of material arranged on an inner main surface of the plate. The method further comprises providing a housing body with a first and a second cavity separated by an optical barrier, wherein an optical emitter is arranged in the first cavity and a measurement photodetector and a reference photodetector are both arranged in the second cavity. The housing body may for example comprise a frame body, a bottom plate and the optical barrier. The method further comprises attaching, for example gluing, the cover arrangement to the housing body such that the cover arrangement covers the first and the second cavity.

The one or more layers comprise an opaque coating with a first and a second aperture located above the first cavity, and with a third and a fourth aperture located above the second cavity. The emitter is arranged and configured to emit light through the first aperture, and the measurement photodetector is arranged and configured to detect light entering the second cavity through the fourth aperture. The second and the third aperture establish a reference path for light from the emitter to the reference photodetector.

Further implementations of the method are readily derived from the various implementations of the sensor arrangement and vice versa.

BRIEF DESCRIPTION OF THE DRAWINGS

In the following, the disclosure is explained in detail with the aid of exemplary implementations by reference to the drawings. Components that are functionally identical or have an identical effect may be denoted by identical references. Identical components and/or components with identical effects may be described only with respect to the figure where they occur first and their description is not necessarily repeated in subsequent figures. All features of specific implementations may be combined with other implementations if not stated otherwise.

In the drawings,

FIG. 1A shows a cross section of an exemplary implementation of an optical sensor arrangement according to the improved concept. FIG. 1B shows a top view of the same sensor arrangement.

DETAILED DESCRIPTION

Figure 1A:
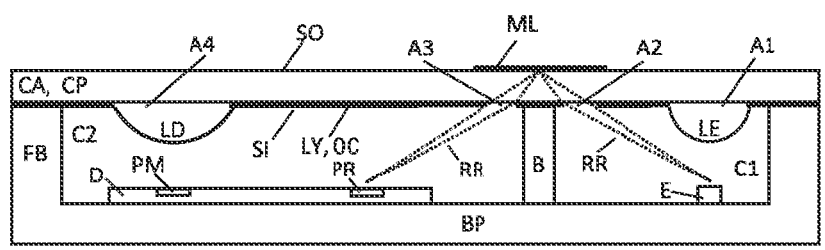
FIGS. 1A to 1D show different views of an exemplary implementation of an optical sensor arrangement according to the improved concept.

The optical sensor arrangement comprises a housing with a frame body FB, a bottom plate BP and an optical barrier B. The frame body FB, the bottom plate BP and the optical barrier B are for example made of or comprise an optically opaque material. The sensor arrangement further comprises a cover arrangement CA arranged on a side of the housing opposite to the bottom plate BP. The optical barrier B separates an interior of the housing into a first cavity C1 and a second cavity C2, which are covered by the cover arrangement CA.

An optical emitter E, for example a laser, in particular a VCSEL or VECSEL, is arranged in the first cavity C1, for example on the bottom plate BP. A measurement photodetector PM and a reference photodetector PR are arranged in the second cavity C2, for example on the bottom plate BP. The photodetectors PM, PR are for example comprised by a single detector die D, in particular by a single integrated circuit. Therein, the reference photodetector PR is for example arranged closer to the optical barrier B than the measurement photodetector PM.

The cover arrangement CA comprises an optically transparent or translucent cover plate CP (not shown in FIG. 1B), for example made of glass or a plastic material. The cover arrangement CA further comprises at least one layer of material LY on an inner main surface SI of the cover plate CP including an optically opaque coating OC. The optically opaque coating OC is for example implemented as an ink coating, in particular a black ink coating.

The opaque coating OC has a first aperture A1 arranged above the emitter E and a fourth aperture A4 arranged above the measurement photodetector PM. The opaque coating OC further has a second aperture A2 arranged in a region of the inner main surface SI facing the first cavity C1 and a third aperture A3 arranged in a region of the inner main surface SI facing the second cavity C2. The second and third apertures A2, A3 are for example arranged closer to the optical barrier B compared to the first and second apertures A1, A4. As can be seen in FIG. 1B, the second and third apertures A2, A3 have for example circular outlines. However, obviously different shapes such as elliptical, rectangular or square shapes are also possible.

The opaque coating OC as well as the frame body FB and the optical barrier B are for example made from optically opaque materials such that ambient light from outside of the sensor arrangement as well as light corresponding to an emission spectrum of the emitter E is blocked or attenuated by said components. Also the bottom plate BP may be made or partially made from an optically opaque material to block or attenuate ambient light and light corresponding to the emission spectrum. Consequently, apart from the apertures A1, A2, A3, A4, the first and the second cavity C1, C2 are optically isolated from each other. In particular, light emitted by the emitter E may leave the first cavity C1 only through the first or the second aperture A1, A2 and light may enter the second cavity and thus reach the photodetectors PR, PM only through the third or fourth aperture A3, A4.

In operation, the emitter E emits light with a wavelength within the emission spectrum, for example light of a specified emission wavelength up to respective tolerances. The emitter may for example emit the light in a pulsed manner, for example with a frequency in the kHz range, for example at 80 kHz. A first fraction, in particular a main fraction, of the emitted light may leave the sensor arrangement through the first aperture A1 and be for example at least partially reflected by an external object (not shown). The partially reflected light may for example enter the second cavity C2 through the fourth aperture A4 and consequently be detected by the measurement photodetector PM. The measurement photodetector PM generates for example a measurement signal in response to the detected light.

Furthermore, the second and the third apertures A2, A3 establish a reference path for light emitted by the emitter E between the emitter E and the reference photodetector PR. Consequently, a second fraction, in particular a reference fraction, of the emitted light may enter the cover plate CP through the second aperture A2, be reflected at an outer main surface SO of the cover plate CP and enter the second cavity C2 via the third aperture A3. In this way, for example a reference beam RR of light may be formed. The light of the reference beam RR is then for example detected by the reference photodetector PR, which may generate a reference signal based on the detected light.

A control unit (not shown) of the sensor arrangement may for example be comprised by the detector die D or by a further die connected to the detector die D. The control unit may receive the measurement signal and the reference signal and compute a start time t1 for a TOF measurement based on the reference signal and a stop time t2 for the TOF measurement based on the measurement signal. A TOF $t_{TOF}$ of the light propagating between the sensor arrangement and the external object may then be computed by the control unit as $t_{TOF}$=t2−t1. A distance d between the sensor arrangement and the external object is then given for example by d=c*$t_{TOF}$/2, with c denoting the speed of light in particular for the emitted light. The factor of 2 accounts for the propagation from the sensor arrangement to the external object and back.

The reference beam RR, in particular a position at which to a reference beam RR hits the detector die D, may be controlled accurately by adapting the sizes of the second and third apertures A2, A3 and their positions. This may be possible in a particularly precise way by defining the apertures A2, A3 in the opaque coating OC by means of photolithography.

Optionally, the sensor arrangement may further comprise a mirror layer ML arranged on the outer main surface SO. The mirror layer ML covers at least a portion of the outer main surface SO lying between the second and the third aperture A2, A3. In particular, the mirror layer ML covers a portion of the outer main surface SO that is hit by the reference beam RR.

The mirror layer ML is for example implemented as a metal layer, for example an aluminum layer. Consequently, a reflection of the reference beam RR from the outer main surface SO may be improved by the mirror layer ML. In implementations without the mirror layer ML, the reference beam RR may for example be reflected from the interface between the outer main surface SO and air or another medium surrounding the sensor arrangement.

Figure 1B:
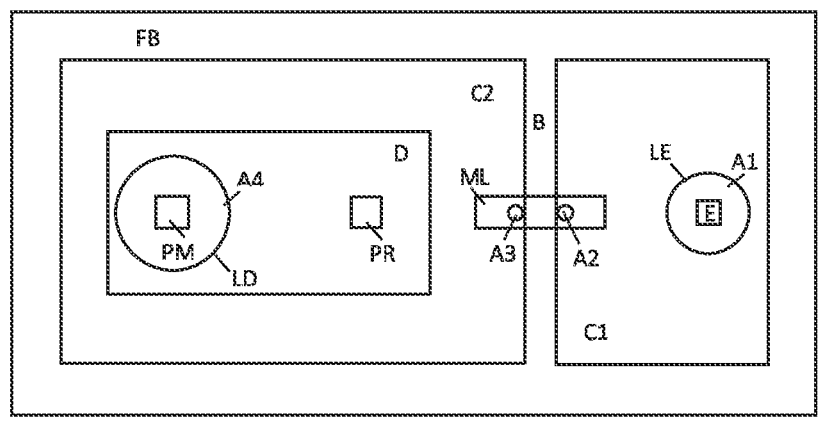

In the shown example of FIGS. 1A and 1B, the mirror layer ML optionally further covers the second and the third aperture A2, A3. In particular, the mirror layer ML may have the shape of a strip, for example rectangular strip, covering the second and the third aperture A2, A3 and the region between them. By covering the second and the third aperture A2, A3, the mirror layer ML may prevent ambient light to enter the sensor arrangement through the second and the third aperture A2, A3, thus further improving the measurement accuracy.

Furthermore, the sensor arrangement may optionally comprise an emitter lens LE arranged above the emitter E and/or a detector lens LD arranged above the measurement detector PM. The lenses LE, LD are for example arranged on the inner main surface SI or on the layers of material LY and may for example cover the first and the fourth aperture A1, A4, respectively.

Figure 1C:
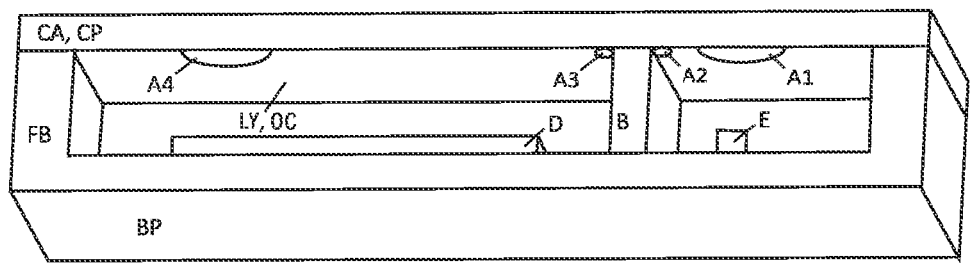
Figure 1D:
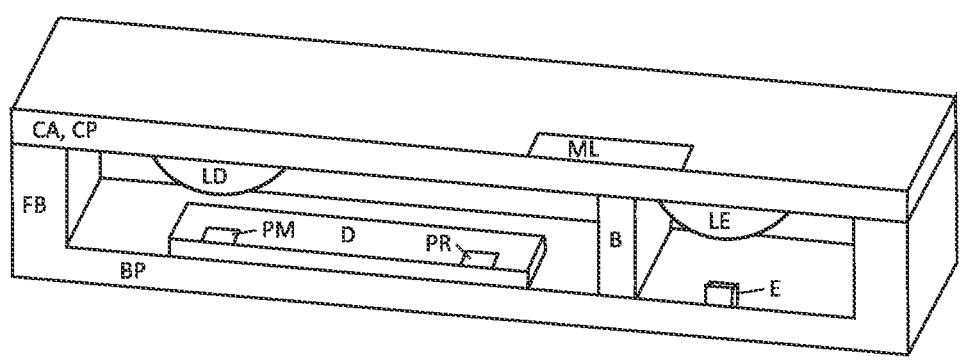

FIGS. 1C and 1D show perspective cut views of the sensor arrangement of FIGS. 1A and 1B. In FIG. 1C, the optional lenses LE, LD are omitted.

Figure 2:
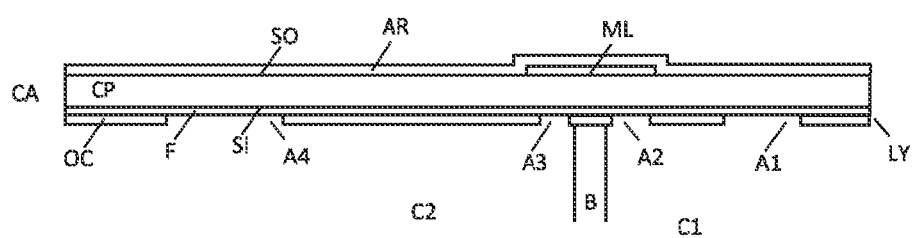
FIG. 2 shows a cover arrangement of a further exemplary implementation of an optical sensor arrangement according to the improved concept.

FIG. 2 shows the cover arrangement CA and the optical barrier B of a further exemplary implementation of an optical sensor arrangement according to the improved concept. The cover arrangement CA of FIG. 2 corresponds for example to the cover arrangement CA of the sensor arrangement of FIGS. 1A through 1D.

The cover arrangement CA of FIG. 2 may further comprise an optional anti-reflective coating AR arranged at least on the outer main surface SO at portions above the first and the fourth aperture A1, A4. In some implementations, the anti-reflective coating AR may cover the outer main surface SO completely or completely up to regions covered by the mirror layer ML, if applicable.

Due to the anti-reflective coating AR, light entering the cover plate CP via reflections from the outer main surface SO after leaving the first cavity C1 through the first aperture A1 may be reduced. Furthermore, it is avoided that light present in the cover plate CP enters the second cavity C2 via reflections from the outer main surface SO through the fourth aperture A4. Consequently, undesired optical crosstalk between the emitter E and the measurement photodetector PM may be reduced.

In implementations comprising the optional mirror layer ML and the anti-reflective coating AR, the mirror layer ML may be arranged directly on the outer main surface SO and the anti-reflective coating AR may be arranged directly on the outer main surface SO, where the mirror layer ML is not present and on the mirror layer ML otherwise. In alternative implementations, the mirror layer ML may be arranged on the anti-reflective coating AR. Then, the anti-reflective coating AR may cover the outer main surface SO completely.

Optionally, the cover arrangement CA, in particular the layers of material LY, may further comprise an optical filter layer F, for example an interference filter, covering at least a portion on the inner main surface SI corresponding to the fourth aperture A4. The filter layer F may for example block or attenuate light outside the emission wavelength spectrum of the emitter E and pass light within the emission wavelength spectrum. In this way, exclusively or predominantly light with a wavelength within the emission wavelength spectrum may be enter the second cavity C2 and be detected by the measurement photodetector PM.

The filter layer F may for example cover the inner main surface SI completely. In particular, the filter layer F may be arranged between the opaque coating OC and the inner main surface SI.

Figure 3A:
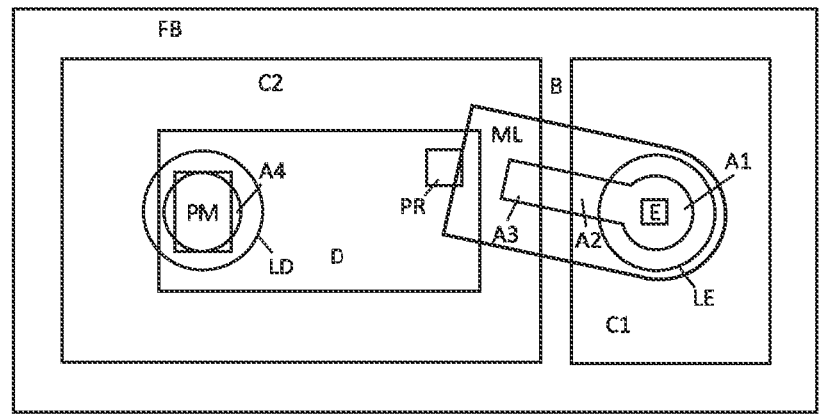
FIGS. 3A to 3C show different views of a further exemplary implementation of an optical sensor arrangement according to the improved concept.

FIG. 3A shows a top view of a further exemplary implementation of an optical sensor arrangement according to the improved concept. The implementation of FIG. 3A is based on the implementation of FIGS. 1A through 2.

While the photodetectors PM, PR and the emitter E are arranged for example collinearly or approximately collinearly in the implementations of FIGS. 1A to 1D, this is for example not the case FIG. 3A. Rather, the reference photodetector PR may be shifted with respect to the connection line between the measurement photodetector PM and the emitter E. This may have the advantage that a probability that light of the reference beam RR is detected by the measurement photodetector PM is further reduced.

Furthermore, in contrast to the implementation of FIGS. 1A to 1D, the first, second and third apertures A1, A2, A3, are not implemented as separate openings in the opaque coating OC in the implementation of FIG. 3A. Rather, the opaque coating OC comprises an opening forming an aperture area. The aperture area has for example a circular or partially circular portion forming the first aperture A1 and a slit portion connected for example to the circular portion and forming for example the second and third apertures A2, A3. Therein, the circular portion corresponds to a circular opening in the opaque coating OC arranged above the emitter E. The slit portion corresponds to a slit-like opening in the opaque coating extending from the circular opening across a position of the optical barrier B into the second cavity C3.

A first part of the slit portion arranged above the first cavity C1 forms the second aperture A2 and a second part of the slit portion arranged above the second cavity C2 forms the third aperture A3. Consequently, the first and the second aperture A1, A2 are for example connected. The second and the third aperture A2, A3 are effectively separated by the optical barrier B.

The optional mirror layer ML covers for example the third aperture A3, at least partially the second aperture A2 and a region between the second and the third aperture A2, A3. Furthermore, the mirror layer ML may for example surround the first aperture A1, but in any case leaves open the first aperture A1 at least partially such that the emitted light may leave the sensor arrangement through the first aperture A1.

With respect to the operation of the sensor arrangement, it is referred to the explanations with respect to FIGS. 1A through 1D and 2.

Figure 3B:
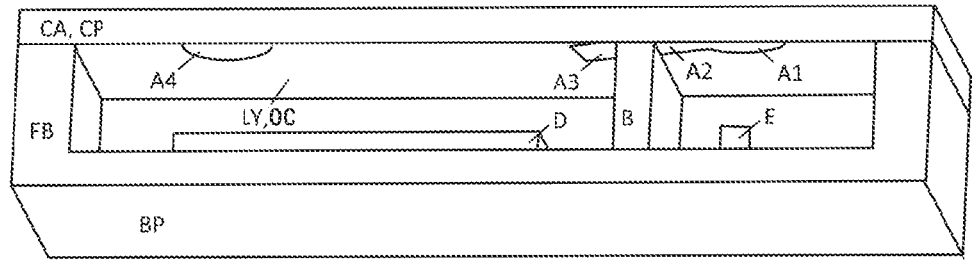
Figure 3C:
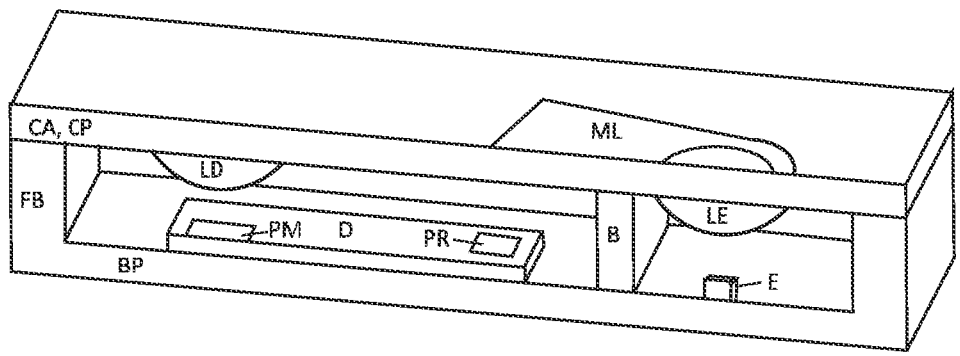

FIGS. 3B and 3C show perspective cut views of the sensor arrangement of FIG. 3A. In FIG. 3B, the optional lenses LE, LD are omitted.

In the following, implementations of methods for manufacturing a sensor arrangement as in one of FIGS. 1A through 3C is explained.

The frame body FB, the optical barrier B and the bottom plate BP may for example be manufactured by molding or pre-molding said components to a leadframe. Consequently, said components are formed by a single piece of material, for example a dark or black or optically opaque plastic or epoxy material. Thus, light leakage between the cavities C1, C2 may be avoided.

Alternatively, the frame body FB and the optical barrier may be attached, for example by an adhesive, to a separate bottom plate BP implemented as a carrier substrate. Therein, the frame body FB and the optical barrier B may be separate components or may be made from a single piece, for example a single molded piece, of material.

Electrically conducting structures may be embedded within the bottom plate BP for example for power supply of the photodetectors PR, PM, the control unit and the emitter E.

The photodetectors PR, PM and the control unit, in particular the detector die D, and the emitter E are attached to the bottom plate BP, for example using an adhesive. Then, respective electrical connections may be established, for example using wire bonding between the conducting structures of the bottom plate BP and the photodetectors PR, PM, the control unit, in particular the detector die D, and/or the emitter E.

Then, the cover arrangement CA may be attached, for example glued, to the frame body FB to close the cavities C1, C2. Then, singulation into individual optical sensor arrangements may be performed if applicable.

For manufacturing the cover arrangement, a transparent or translucent substrate, for example a glass wafer or plastic wafer, for forming the cover plate CP is provided. Then, if applicable, the optional filter layer F is for example deposited on the inner main surface SI. The opaque coating OC, is deposited on the inner main surface SI or, if applicable, on the filter layer F and is subsequently structured by means of photolithography to define the apertures A1, A2, A3, A4.

If applicable, the optional mirror layer ML is deposited on the outer main surface SO and is subsequently structured by means of photolithography to cover only the desired portions as described above. In particular, portions of the mirror layer ML covering the first and fourth apertures A1, A4 are removed by the photolithography.

If applicable, the optional anti-reflective coating AR is deposited. Therein, the anti-reflective coating AR may be deposited before or after the mirror layer AR. The anti-reflective coating AR may for example be structured by means of photolithography to remove the anti-reflective coating AR from portions on the outer main surface SO between the second and the third aperture. This may be necessary if no mirror layer ML is used, since otherwise the formation of the reference beam RR could be suppressed. If the mirror layer ML is used, the removal of the portions of the anti-reflective coating AR may not be necessary.

Then, if applicable, the optional lenses LE, LD may be formed, in particular molded, for example in a wafer-lever process.

Then, the coated transparent or translucent substrate may be diced to size in order to fit the housing of an individual sensor arrangement. Subsequently, the cover arrangement CA may be attached to the frame body FB as described above.

By means of an optical sensor arrangement according to the improved concept, TOF measurements with improved accuracy may be performed. In particular, the reference beam RR defined by the second and third apertures A2, A3 may be detected by the reference photodetector PR. A ratio of light intensity of the reference beam RR reaching the measurement photodetector PM and light intensity of the reference beam RR reaching the reference photodetector PR may be strongly reduced, for example may be in the order of 1/1000. This may allow for a particularly precise determination of the start and the stop time.

In a sensor arrangement according to the improved concept, the optical barrier B is for example not placed on the detector die D. Therefore, smaller detector die sizes may be used.

Since the cover arrangement may be manufactured basically on wafer level or panel level, corresponding manufacturing methods may be less complex and more efficient than for example single device level manufacturing methods.

The invention claimed is:

1. An optical sensor arrangement for time-of-flight measurement, the sensor arrangement comprising
a housing with a first and a second cavity separated by an optical barrier, and with a cover arrangement covering the first and the second cavity;
a measurement photodetector and a reference photodetector both arranged in the second cavity and an optical emitter arranged in the first cavity; wherein
the cover arrangement comprises a translucent or transparent plate and one or more layers of material arranged on an inner main surface of the plate;

the one or more layers comprise an opaque coating with a first and a second aperture located above the first cavity, and with a third and a fourth aperture located above the second cavity;

the emitter is arranged and configured to emit light through the first aperture, and the measurement photodetector is arranged and configured to detect light entering the second cavity through the fourth aperture; and the second and the third aperture establish a reference path for light from the emitter to the reference photodetector;

wherein a mutual arrangement of the emitter, the reference photodetector, the second aperture and the third aperture is adapted such that fractions of light emitted by the emitter enter the plate through the second aperture, are at least partially reflected at an outer main surface of the plate, enter the second cavity through the third aperture, and hit the reference photodetector.

2. The optical sensor arrangement according to claim 1, wherein
the cover arrangement further comprises a mirror layer arranged on an outer main surface of the plate
covers at least a portion of the outer main surface located between the second and the third aperture.

3. The optical sensor arrangement according to claim 2, wherein the mirror layer further covers portions of the outer main surface located directly above the second and/or the third aperture.

4. The optical sensor arrangement according to claim 1, wherein
the cover arrangement further comprises an anti-reflective coating arranged on an outer main surface of the plate; and
the anti-reflective coating covers at least a portion of the outer main surface located directly above the first and/or the fourth aperture.

5. The optical sensor arrangement according to claim 1, wherein
the one or more layers of material further comprise an optical filter layer covering at least a portion on the inner main surface corresponding to the fourth aperture; and
the optical filter layer is configured to pass light with a wavelength lying within an emission wavelength range of the emitter.

6. The optical sensor arrangement according to claim 5, wherein the optical filter layer is configured to block or attenuate light with a wavelength lying outside of the emission wavelength range.

7. The optical sensor arrangement according to claim 1, wherein the opaque coating comprises an ink.

8. The optical sensor arrangement according to claim 1, wherein the housing comprises a frame body confining the first and the second cavity laterally.

9. The optical sensor arrangement according to claim 8, wherein the frame body and the optical barrier are comprised by one continuous piece of material.

10. The optical sensor arrangement according to claim 8, wherein the housing comprises a bottom plate on which the measurement photodetector, the reference photodetector and the emitter are arranged, the bottom plate confining the first and the second cavity on a side opposite to the cover arrangement.

11. The optical sensor arrangement according to claim 10, wherein the frame body, the optical barrier and at least parts of the bottom plate are comprised by one continuous piece of material.

12. The optical sensor arrangement according to claim 1, further comprising a control unit, wherein
the measurement photodetector is configured to generate a measurement signal in response to light detected by the measurement photodetector;
the reference photodetector is configured to generate a reference signal in response to light detected by the reference photodetector; and
the control unit is configured to compute a time-of-flight depending on the measurement signal and the reference signal.

13. The optical sensor arrangement according to claim 12, wherein the control unit, the measurement photodetector and the reference photodetector are integrated on a single semiconductor die.

14. A method for manufacturing an optical sensor arrangement for time-of-flight measurement, the method comprising
providing a cover arrangement with a translucent or transparent plate and with one or more layers of material arranged on an inner main surface of the plate;
providing a housing body with a first and a second cavity separated by an optical barrier, wherein an optical emitter is arranged in the first cavity and a measurement photodetector and a reference photodetector are both arranged in the second cavity; and
attaching the cover arrangement to the housing body such that the cover arrangement covers the first and the second cavity; wherein
the one or more layers comprise an opaque coating with a first and a second aperture located above the first cavity, and with a third and a fourth aperture located above the second cavity;
the emitter is arranged and configured to emit light through the first aperture, and the measurement photodetector is arranged and configured to detect light entering the second cavity through the fourth aperture; and
the second and the third aperture establish a reference path for light from the emitter to the reference photodetector;
wherein a mutual arrangement of the emitter, the reference photodetector, the second aperture and the third aperture is adapted such that fractions of light emitted by the emitter enter the plate through the second aperture, are at least partially reflected at an outer main surface of the plate, enter the second cavity through the third aperture, and hit the reference photodetector.

* * * * *